June 3, 1958  T. B. MARTIN  2,837,027
DIRECTIONAL SHOOTING OF WELLS
Filed Nov. 1, 1955  4 Sheets-Sheet 1

June 3, 1958  T. B. MARTIN  2,837,027
DIRECTIONAL SHOOTING OF WELLS
Filed Nov. 1, 1955  4 Sheets-Sheet 2

INVENTOR
Thomas B. Martin
By Green, McCallister & Miller
His Attorneys

June 3, 1958 T. B. MARTIN 2,837,027
DIRECTIONAL SHOOTING OF WELLS
Filed Nov. 1, 1955 4 Sheets-Sheet 3
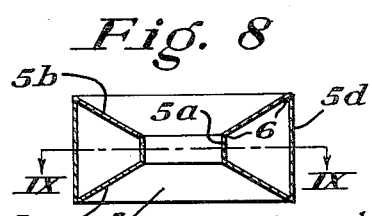
Fig. 8
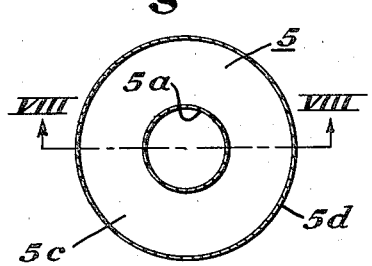
Fig. 9
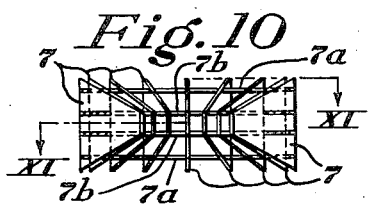
Fig. 10
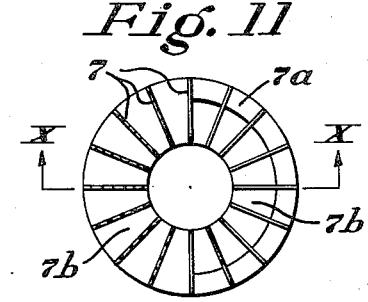
Fig. 11
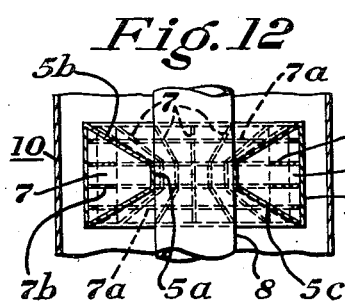
Fig. 12
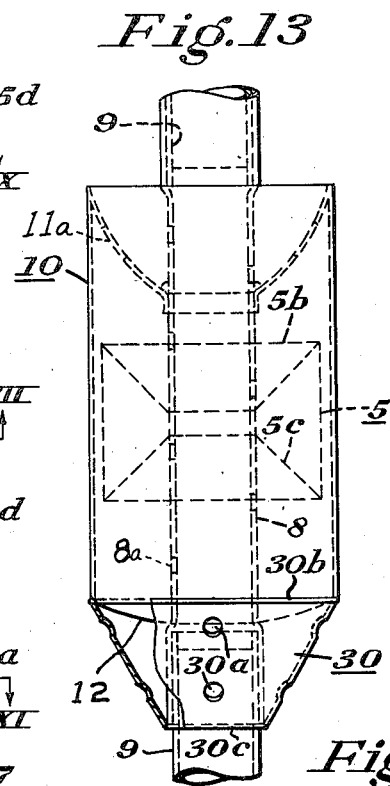
Fig. 13
Fig. 10A
Fig. 11A
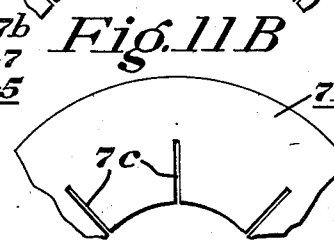
Fig. 11B
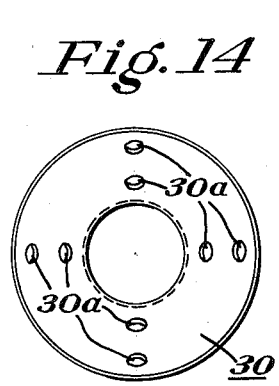
Fig. 14
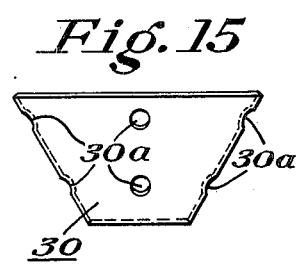
Fig. 15
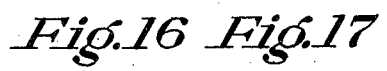
Fig. 16 Fig. 17
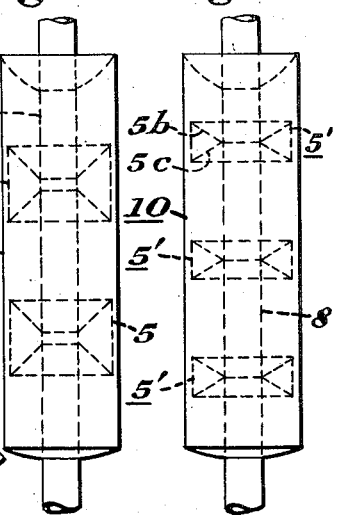
INVENTOR
Thomas B. Martin
By Green, McCallister & Miller
His Attorneys

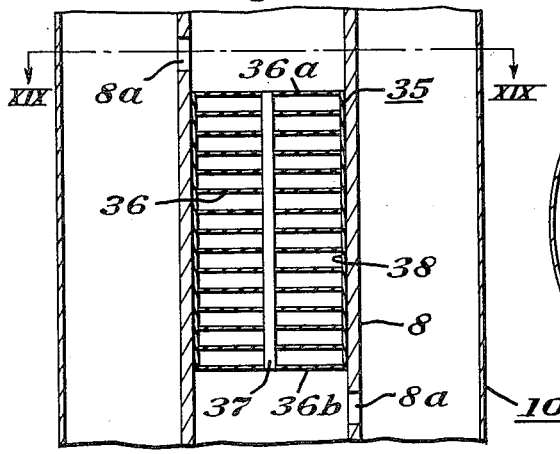
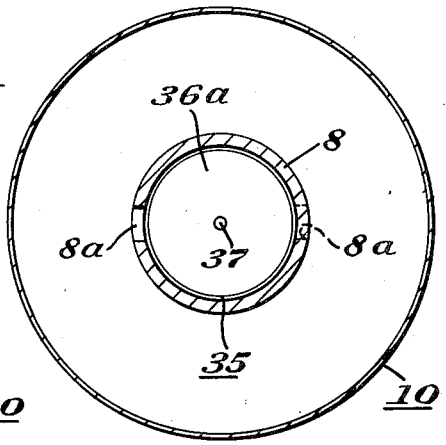
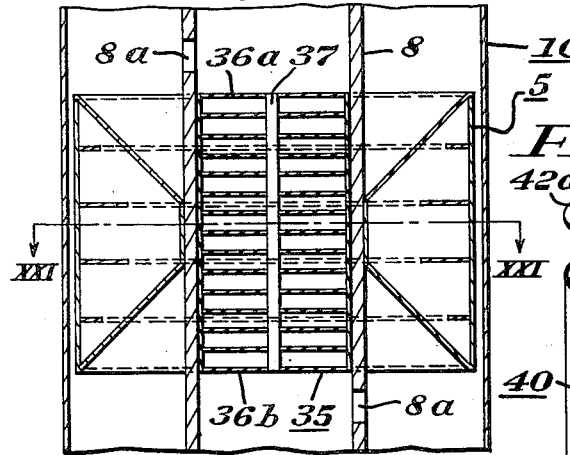
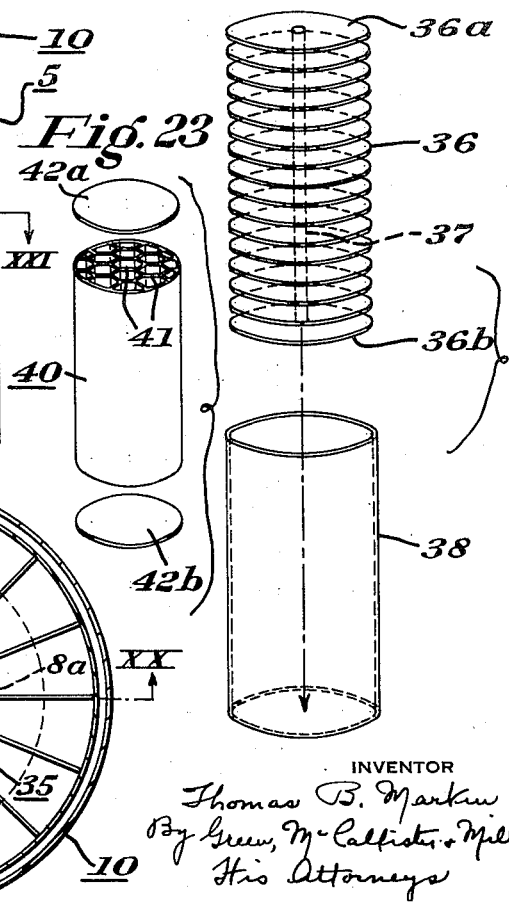
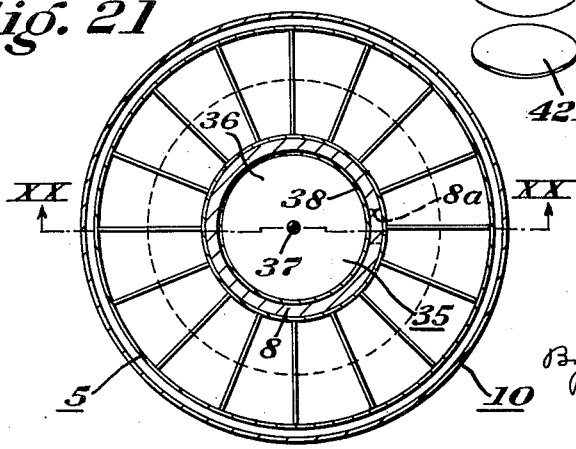

United States Patent Office 2,837,027
Patented June 3, 1958

2,837,027

DIRECTIONAL SHOOTING OF WELLS

Thomas B. Martin, Bradford, Pa.

Application November 1, 1955, Serial No. 544,615

9 Claims. (Cl. 102—20)

This invention pertains to the directional shooting of wells, and more particularly, to the concentration or strengthening of the effective forces of a shooting charge on desirable or productive strata of a well.

In shooting of wells it has been customary to utilize torpedo shells or cans containing a suitable explosive which ordinarily varies in amount from approximately 5 to 300 pounds. The shells are provided with a diameter smaller than the inside of the well hole into which they are to be lowered and may have a length depending upon the nature and width of the formation to be shot.

Although shells are ordinarily placed end to end through the interval to be shot, I prefer to space them as set forth in my application entitled "Selective Shooting of Wells." Serial No. 777,444, filed October 2, 1947, now abandoned. The charges or string of charges are "stemmed" or tamped with a suitable material or fluid such as water, sand, gravel, or gypsum cement. After the explosion, the resulting gases are confined by the stemming so that their disruptive forces are exerted against the well wall.

Employing an ordinary can, the disruptive forces produce a cavity which is somewhat pear-shaped, depending upon the particular type of the adjacent strata. That is, as shown in Figure 1 of the drawings, the disruptive forces move outwardly from the shell or explosive container in substantially radial paths. Even where the container or shell is itself positioned in substantial alignment with a productive stratum, the radial forces tend to fracture and shatter adjacent strata of non-productive layers such as cap rock.

This effect is disadvantageous for a number of reasons. In the first place, it tends to unnecessarily fill up the well hole with rock fragments with some attendant clogging of the intermediate productive stratum. Secondly, the effectiveness of the charge is diverted to non-productive strata and the desired maximum effectiveness of the charge is limited as to the productive stratum being shot. Although stemming, itself, tends to confine the explosive, its volume density is limited in its reaching effect in a lateral direction by the undesirable overall radial direction taken by the forces involved. Theoretical analysis indicates that the fracturing radius varies as the cube root of the size of the charge for static conditions and as the first power of the size of the charge when the time rate at which the pressure is applied is considered.

I have also determined that as a third factor, the shock lines of force which are directed toward adjacent cap rock or non-productive strata are reflected back toward the charge. This action tends to offset or neutralize the effectiveness of the charge.

I have discovered that rather surprising results are obtained if an air or gas space, a vacuum space or a space having a fluid of lesser density than the charge is provided between portions of the charge or intermediate the length or depth of the charge. After considerable experimental work, I have determined that such a space will divert the radii forces which emanate from the charge as a radial band or annulus along a plane substantially at right angles to the charge and parallel to the longitudinal extent of, or radially into the productive stratum. That is, the forces are concentrated in a lateral path from the length of the charge and are diverted away from longitudinal ends of the charge. As a result, the explosive forces are very materially strengthened or more effectively employed to enlarge the stratum corresponding to the productive portion of the well hole (jet-like action). The above enumerated and other disadvantageous results of conventional shooting procedure have been eliminated. In this connection see the somewhat diagrammatic showing of Figure 2 of the drawings.

It has thus been an object of my invention to discover procedure for eliminating the disadvantageous features of explosive force diversion and for improving the effectiveness of a particular explosive charge in the shooting of well holes;

Another object of my invention has been to provide improved apparatus utilizing the discoveries of my invention;

Another object has been to greatly increase the effectiveness of or to laterally concentrate the forces of an explosive charge within a well hole;

A further object of my invention has been to discover how explosive forces having a normally undesirable direction may be diverted in a desirable direction by simple, efficient, and effective means;

A still further object has been to increase the penetrating power of a given charge.

These and many other objects of my invention will appear to those skilled in the art from the description thereof, the appended claims, and the illustrative embodiments chosen for the purpose of illustration.

In the drawings:

Figure 8 is a vertical sectional view in elevation through a form of directionator device or element which is constructed and arranged to be positioned within an explosive can to direct and/or concentrate the explosive forces;

Figure 9 is a horizontal sectional view taken along the line IX—IX of Figure 8;

Figure 10 is a vertical view in elevation of a form of strengthening or reinforcing fin structure that may be employed in connection with the directionator device of Figures 8 and 9;

Figure 10A is an enlarged vertical view in elevation showing a detail of a reinforcing fin element of the arrangement of Figure 10;

Figure 11 is a horizontal top view, partially in section, taken along the line XI—XI of Figure 10;

Figures 11A and 11B are enlarged fragmental views of other fin elements of the arrangement of Figure 10;

Figure 12 is a vertical fragmental section in elevation showing how the reinforcing fin structure of Figure 10 is mounted or positioned within the housing of the device of Figure 8, as well as how the device may be positioned within an explosive can or container;

Figure 13 is a vertical view in elevation, somewhat similar to Figure 4, with the explosive fluid omitted, and illustrating a guide and/or reinforcing element for the lower end of the explosive can;

Figure 14 is a top plan view of the guide element shown in a mounted relationship in Figure 13, and, Figure 15 is a side view in elevation of the guide element of Figure 14;

Figures 16 and 17 are somewhat diagrammatical vertical views in elevation showing various utilizations of the principles of my invention and illustrating that a plurality of and modified forms of directionator devices may be utilized within a given explosive can;

Figure 18 is an enlarged fragmental section through a container or can such as shown in Figure 13 and illustrating a second form of directionating device;

Figure 19 is a horizontal section taken along the line XIX—XIX of Figure 18;

Figure 20 is a view similar to Figure 18, but showing a directionating device such as shown in Figure 12 in combination with a second device such as shown in Figure 18;

Figure 21 is a horizontal section taken along the line XXI—XXI of Figure 20;

Figure 22 is an exploded vertical view showing a method of constructing and assembling the device of Figure 18; and, Figure 23 is a reduced exploded vertical view somewhat similar to Figure 22 showing a modified or honeycomb type of directionating device.

Figure 2:
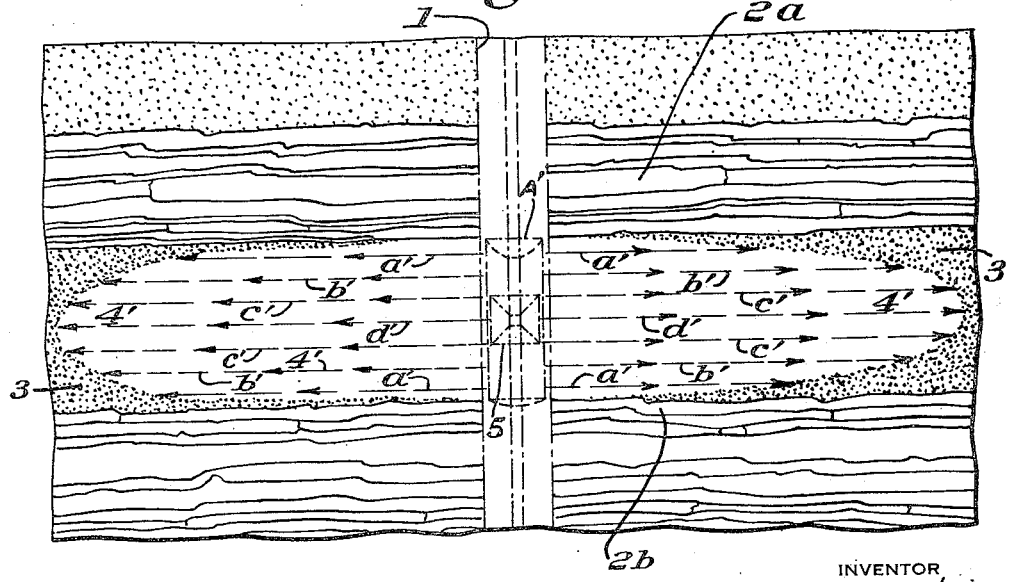
Figure 2 is a view similar to Figure 1, showing an explosion produced in accordance with my invention, wherein the forces are greatly strengthened, are concentrated, and are directed in a substantial lateral direction along the depth or thickness of a productive stratum.

In accordance with my invention, I provide a given explosive can, container or shell with a directionator device, or in other words, provide a space within or between parts of the explosive can such that fractionating forces will be directed toward a plane substantially at right angles to the length or depth of the charge. In other words, in accordance with my invention, see Figure 2, the disruptive forces are directed and concentrated substantially laterally of the longitudinal or axial extent of the charge, so that such forces may have a maximum fractionating effect upon a stratum lying within a plane representing the longitudinal extent of the charge. The spacing provided may be of any suitable type. That is, although I preferably utilize an air, nitrogen, or vacuum space by reason of the less expense involved, I also have employed lighter than air gases such as argon, hydrogen, helium, etc. for further increasing the directional effect. Fluids including liquids lighter than the charge may also be employed, but with less efficiency. From a general standpoint, I find that ordinary air is entirely satisfactory and is much more efficient than heavier materials. Reinforcing structure to prevent a collapse of the walls of the spacer device is more essential when lighter than air materials are employed. In this connection, it will be apparent that supporting walls of my directionating device define an area (supported) of different density than the explosive material. It will also be apparent that the central-longitudinal positioning of such device with respect to the explosive material and its defined area of different density thus provide an improved effect, such as shown in Figure 2 of the drawings.

The shape of the space may be varied depending upon the exact type of directional effect to be produced. To produce a greater annular diameter of explosive jet and one that is concentrated in a plane transverse, or lateral of the longitudinal charge, I prefer to utilize a space whose walls define an enclosed chamber or bounding area that increases radially outwardly in a diverging path from an axial plane or line through the charge or the can containing the charge, see Figure 8. I have found that this produces a maximum pull of fracturing forces (focusing effect) toward a line perpendicular to the axial plane and away from the axial plane. Contrary to what may be believed, I have also determined that the time interval between the explosion of successive charges is decreased, where for example, they are exploded by dropping a squib on the top charge. This is probably due to an increase in the rate of concussion transmission.

I have shown in Figures 16 and 17, how the intermediate positioning of the directionator may be varied along the explosive charge or its container and that a plurality of directionators may be provided particularly where a longer charge is to be employed. For an average size well hole, I have successfully employed a spacing of about 4" between directionators used in connection with a given charge. I have determined that the ultimate effect of the explosive is much greater than if the space had been fully filled with explosive. However, if a number of directionators are employed, I may decrease their individual chamber sizes, so as to provide a maximum directional effect with a minimum loss of explosive space, see Figure 17.

Although any conventional type or method of detonating or firing procedure may be employed in utilizing my invention, I prefer, in view of the importance of the time element involved, to provide a firing system that will from a practical standpoint, be substantially simultaneous for all the charges of a given string. For the purpose of illustration, I have shown an electric firing system, although any conventional method may be employed. The duration of explosion of nitro-glycerin is ordinarily about $\frac{1}{250}$ of a second.

It will be noted that I prefer to carry the explosive charge within its container or can in such a manner that all of its portions are in fluid adjacency, or in other words, are connected by passages within the container or can which may extend about the directionator or directionators devices. Thus, the time element involved in exploding upper, intermediate, or lower portions of a charge is minimized; in this connection an explosive such as nitro-glycerin has a speed of about 20,000 feet per second. By employing an electric system, the time element involved in transmitting the concussion of an upper explosion to successive lower charges may be further minimized. An electric current travels about 1,200,000 parts of a second or 4,000 diameters quicker than an explosion along nitro-glycerin.

Although the present invention may be advantageously applied in connection with conventional shooting procedure, it is of particular value when employed in connection with selective shooting procedure, as in this way the maximum possible effect is produced upon productive strata, of the well, or if desired, upon a particular portion of a productive stratum.

Figure 1:
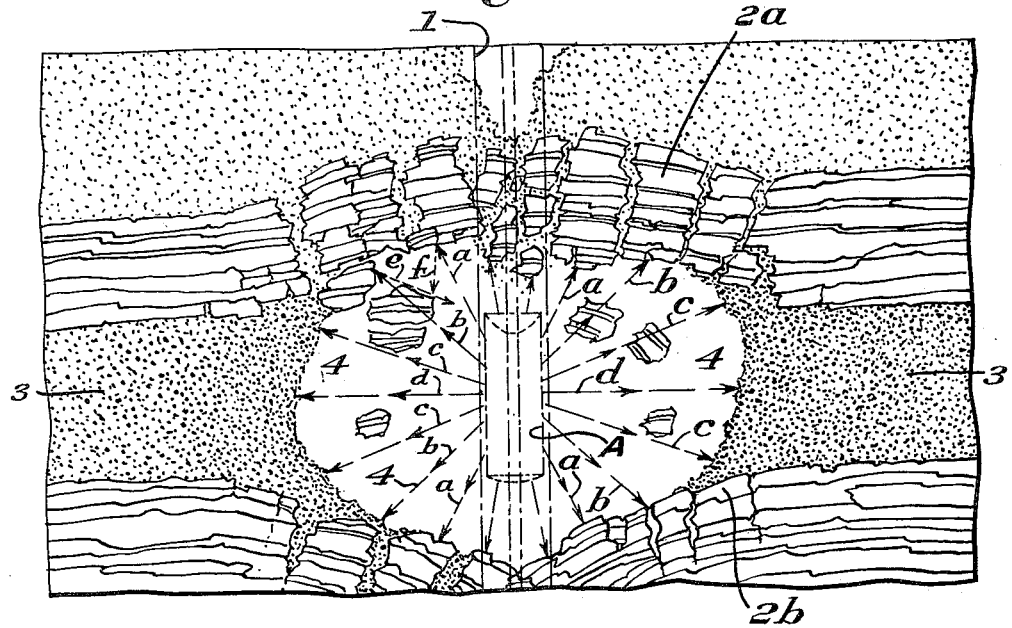
Figure 1 is a somewhat diagrammatic vertical view or fragmental cross section taken through a well hole and showing the normal pear-shape type of fracture which is produced by a shell or explosive can, even when the shell is positioned in substantial alignment with a productive stratum.

Referring to Figure 1 of the drawings, I have indicated an explosive container, can, or shell A as being suspended or supported within a well hole 1. A diagrammatic showing has been made of the forces producing the fracture shape, see the spacing 4. An upper non-bearing stratum is indicated by the numeral 2a, a lower non-bearing stratum by the numeral 2b, and a productive stratum by the numeral 3. Arrow lines, such as a, b, and c indicate forces which are directed away from a perpendicular line through the longitudinal axis of the explosive and that tend to be of increasingly minimized effectiveness as they approach such axis. The arrow line d indicates forces that have the desired lateral direction. Reflecting forces are indicated to the left of the figure by the arrow lines *e* and *f* and their direction will depend upon the particular shape of the rock upon which direct forces such as *a* and *b* impinge.

Figure 2, by way of comparison, shows the result produced when the fractionating forces are directed in accordance with my invention and the fracture pattern 4' results. That is, such forces as *a'*, *b'* and *c'* are pulled down or directed in a lateral plane or one substantially perpendicular to the longitudinal or vertical axis of the charge by the directionator 5.

Referring particularly to Figures 3 and 4, 13, 16 and 17, it will be seen that I have provided cans or containers 10 for the explosive which are provided with at least one directionator device 5. Referring particularly to Figures 8 and 9, the device 5 is shown provided with an inner sleeve or vertical wall portion 5*a*, an upper outwardly-diverging wall portion 5*b*, a lower outwardly-diverging or inclined wall portion 5*c*, and an outer enclosing vertical wall portion 5*d*. These wall portions thus define a chamber or space of frustra-conical shape for directing the explosive forces.

The can 10 as well as the directionator 5 may be made of any suitable material, such as tin or tin-plated iron or steel, steel alloy metal or non-magnetic metals such as aluminum, brass or non-ferrous alloys or plastics. If the device 5 is made of a metal, the wall portions 5*a* and 5*c* and 5*d* may be formed from a unitary piece. The top wall 5*b* may be formed separately and soldered, brazed or welded in position by securing metal 6, see Figure 8 and if a reinforcing structure is to be used, after the reinforcing members or member assembly, see Figures 10 and 12, have been inserted. If the device is fabricated from plastic, the wall portions may be cemented together. If desired, the reinforcing structure may be friction-fitted, soldered, welded, or cemented in position within the device of Figure 8 before the top wall 5*b* is secured. It will be apparent to those skilled in the art that the directionator device may be fabricated in any suitable manner. Referring particularly to Figure 10, I have shown ribs, fins, or reinforcing members 7 and circular spacing and supporting fins or members 7*a* and 7*b* which may be secured to the mounting walls of the space provided and defined by the directionator device 5. Such ribs may be of any suitable material to suitably reinforce the device and prevent its collapse under the weight of the column of explosive fluid and against collapse when a vacuum is employed, for example. In Figure 10, I have shown the fins or ribs assembled in position and forming a complete unit.

Fig. 10A shows a single fin 7 having slots 7*d* which interlock with slots 7*c* of parts 7*a* and 7*b* of Figures 11A 11B to form a structure as shown in Figs. 10 and 11. The parts may be held together by dipping in a solder bath or other suitable means.

In accordance with my invention, the device 5 is shown mounted on a column support member, shell or pipe section 8 at its inner boundary, represented by the wall 5*a*. This may be effected by a suitable securing method, such as above outlined. If desired, threading may also be used.

Figure 4:
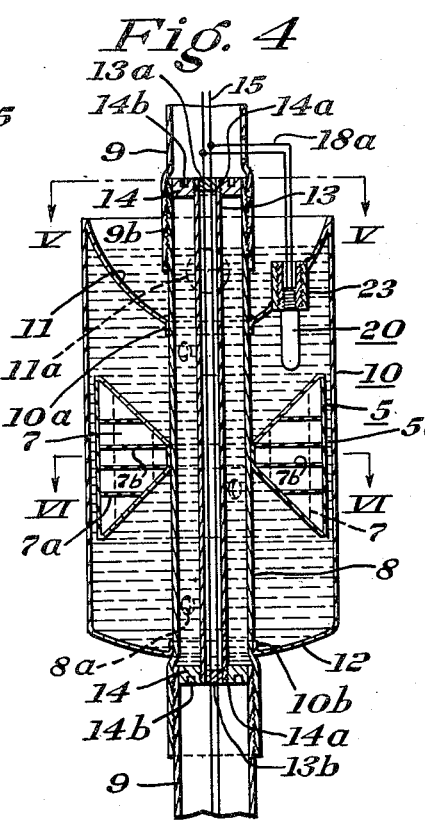
Figure 4 is an enlarged vertical section through one of the explosive shells, cans, or container units of the string of Figure 3 and embodying my invention; this figure is taken along the line IV—IV of Figure 6.

The mounting of the device 5 is preferably accomplished before the container 10 is positioned on the member 8. Although the container shown in Figure 4 may be fabricated from any suitable material, such as mentioned in connection with the device 5, I have, for the purpose of illustration, employed a metal material, such as tin. The container 10 is shown as having outer wall portions mounted on an upper, downwardly-concave or funnel-shaped wall portion 11 and a downwardly convex wall portion 12 on the shell or pipe member 8. That is, as shown in Figure 4, the can 5 has flanges 10*a* and 10*b* for securely mounting it on the member 8. Solder, etc. may be used in this connection.

The upper wall 11 of the container 10 is provided with perforations 11*a*, so that the explosive material may be poured into the inside thereof to substantially fully fill up the spacing defined by its walls and the mounting sleeve or pipe member or section 8 is also provided with perforations or holes 8*a* for the same reason. If, as shown in Figure 4, the charge is to be detonated by a duplex electric cable or line 15, I may employ an inside or centrally-disposed passage pipe or sleeve member 13 of relatively small diameter which is mounted at both ends within the main pipe section 8 by tight-fitting closure cap elements 14. Threads 14*a* are shown about ends of the member 13 and within the central bore of the elements 14 for this purpose. Sealing plugs 13*a* of rubber or other suitable material are employed to seal off opposite ends of the pipe or electricity-carrying wire carrying pipe 13. Indentations 14*b* within the outer surface of the cap elements 14 provide wrench grip portions to screw the elements 14 down on the inside pipe member 13. The above work is preferably effected in the shop before the unit is taken to the field for utilization.

Figure 3:
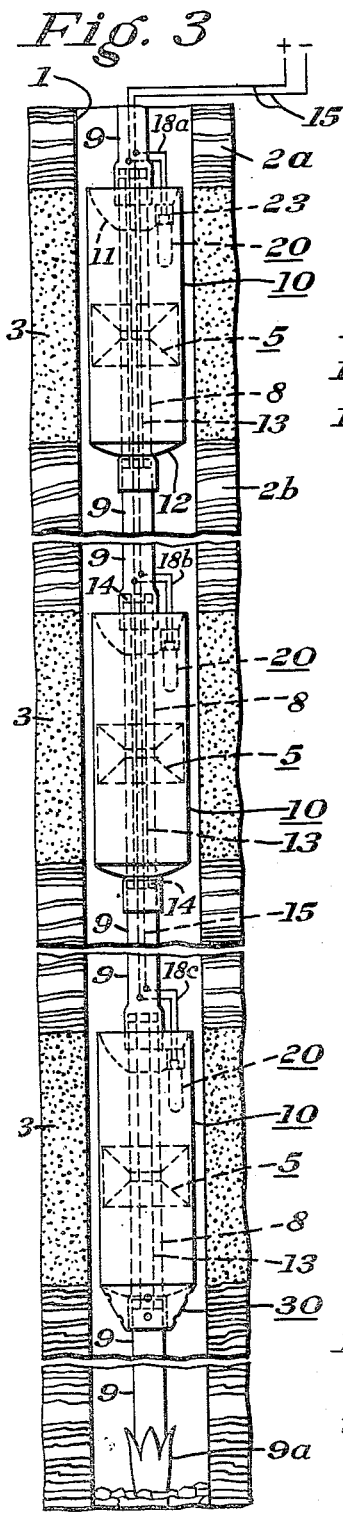
Figure 3 is a vertical section through a well hole showing a number of explosive charges employing my invention connected together as a string with each charge in substantial alignment with a productive stratum; this view also shows the string as resting upon a bridge wall of the bottom of the well.

The units can be fabricated for particular lengths of strata and then taken to the field and mounted as a string, as shown in Figure 3, and each unit may then be lowered successively after it has been filled up with a charge at the well mouth opening.

Figure 7:
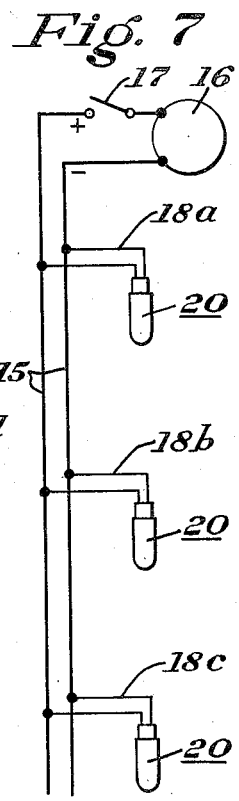
Figure 7 is a diagrammatic layout or circuit arrangement that may be employed for electrically detonating explosive charges.
Figure 5:
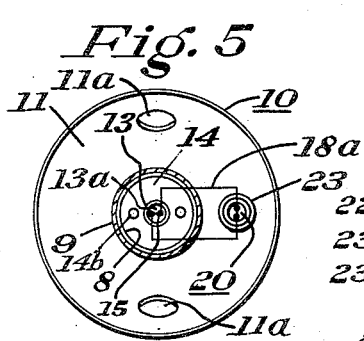
Figure 5 is a horizontal section taken along the line V—V of Figure 4; and, Figure 6 is a similar view taken along the line VI—VI of Figure 4.
Figure 7A:
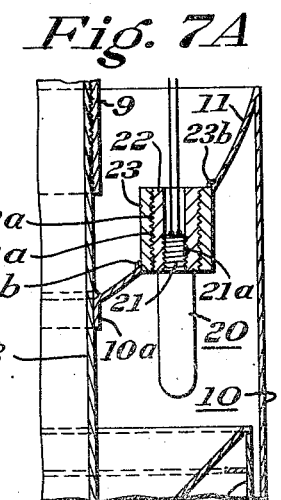
Figure 7A is an enlarged detail (taken from Figure 4) in sectional elevation showing an electric squib mounting.
Figure 6:
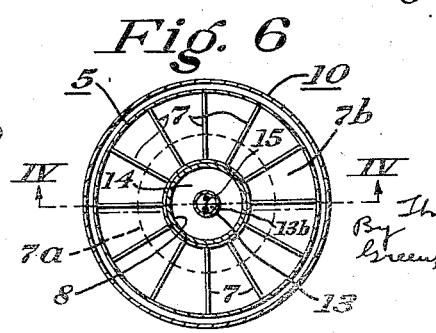

To detonate the charges, I have shown a squib 20 of any suitable type, such as a squib having an electric cap and containing nitro-glycerin and provided, as shown in Figure 7A, with a pin 21 threaded at 21*a* within the threaded bore of an inner mounting element 22. The mounting element 22 is threaded at its outer periphery 22*a* for removably positioning it with respect to threads 23*a* of an outer mount element 23 that is permanently secured by welding or solder metal 23*b* on a wall portion of the can or container 10.

I prefer to secure the mount element 23 within the wall of a container 10 in the shop. For the purpose of illustration, I have shown the permanent or outer mount 23 as extending through the top wall 11 of the container. In this manner the squib 20 can be positioned in a depending relationship within the inside of the container 10. The squib 20, including the inner element 22 may be mounted within the container in the field before the explosive is poured therein.

I have shown in Figure 7 a suitable electric system for simultaneously detonating a number of charges. The system is provided with individual explosive squibs 20. This system includes an electric generator such as a magneto 16, a safety switch 17, and branch lines 18*a*, 18*b*, and 18*c* for each of the individual squibs 20. It will be noted that a parallel wiring system is employed to insure simultaneous explosion.

Referring particularly to Figures 13, 14 and 15, I have also disclosed a guide element 30 which may be securely attached to the bottom wall 12 of the container 10. The element 30 thus serves to guide the cans along the well hole as the string is lowered. Such guide element is shown provided with perforations or holes 30*a* for permitting the tamping material to enter the spacing between the bottom wall of the container and the outer wall of the supporting pipe member or section 8. I have shown soldering, welding, or cementing material 30*b* and 30*c* for securing upper and lower edges of the element 30 on the outer periphery of the pipe section 8. This may be accomplished in the shop.

To provide the necessary or desired spacing between explosive charges, I have shown connector pipe lengths 9. Each spacer or connector pipe 9 is provided at its ends with threads for securing it to threaded ends of the container mounting pipe members 8. Any other suitable type of securing means may be employed, such as a sweat or a solder seat. The length of the spacer pipe section 9 will depend upon the depth or width of a non-productive stratum that is to be by-passed.

In Figure 3, I have shown a supporting end 9*a* on the first or lower spacer pipe member which is adapted to rest upon the bridge wall of the well. In this manner the entire string may be supported both at its bottom and at its top. It will be apparent to those skilled in the art that the principles of my invention and the utilization of my procedure are not limited to the particular apparatus arrangements chosen for the purpose of illustration. It will also be apparent that the string may be supported by a cable.

In Figure 16, I have shown a pair of directionator devices 5 positioned within an explosive can 10. In Figure 17, I have shown a number of directionator devices 5' of somewhat modified construction, in which the inner wall portion 5a of the embodiment of Figure 8 is substantially eliminated and the upper and lower wall portions 5b and 5c meet at their inner edges adjacent the pipe section upon which they are mounted. The "doughnut" shape of the directionator device or element may be varied in accordance with the particular requirements. The directionator device, if desired, may be directly mounted on the inside of the container 10 rather than on the outer walls of the mounting pipe 8 or may be mounted on both, if desired, but in any event, I prefer to provide spacing for fluid passageways between upper and lower portions of the explosive charge of the container.

In Figures 18, 19 and 22, I have disclosed a second form of directionating device or element 35 which is positioned within the supporting member 8 and provides an enclosed chamber or spacing centrally or concentrically of the explosive can or container 10. Figures 20 and 21 show the device 35 used in combination with the device 5.

As shown particularly in Figure 22, the device 35 may be provided with reinforcing discs 36 mounted and secured on a central support rod or pipe member 37 in a spaced-apart relationship therealong. The assembly 36—37 may then be inserted in the cylindrical container 38. Top and bottom discs 36a and 36b are then secured at their edges to ends of the container 38 in such a manner as to provide a closed or sealing-off inner chamber from which explosive fluid is excluded.

In Figure 23, I have shown a modified form of directionating device 40 which may be cast from aluminum or some other suitable metal, alloy or plastic. Honeycomb ribbing 41 provides reinforcing for the outer or defining walls of the container. End pieces 42a and 42b are mounted and secured in position over the ends of the container to seal its inside off from the explosive fluid. The securing of the various pieces such as 36, 36a, 36b, 42a, and 42b, etc. may be effected in any suitable manner, such as suggested for the parts of the device 5.

It will be apparent that the devices 35 may be used separately or in combination with other devices, such as 5, may be aligned with the other devices along the length of the explosive can 10, see Figure 20, or may be offsetly positioned or spaced with respect to devices such as 5. I also contemplate the employment of one or more devices 35 within a given container 10 in a spaced-apart relationship, as well as of a full length device 35 or a plurality of shorter-length, adjacently-positioned devices within a container 10.

An important phase of my invention involves the utilization of a closed-off chamber or space which is so disposed that it is interposed between portions of the charge, and that may be interposed between a portion of the charge and the stratum that is to be shot. Another phase rests in the segregation of an explosive charge within a container in such a way that explosive forces generated by the charge are directed, augmented, and concentrated in a desired manner to increase the effectiveness of the charge in the shooting of wells.

Although for the purposes of illustration, I have shown various embodiments of my invention, it will be apparent to those skilled in the art that various modifications, subtractions, revisions and additions may be made without departing from the general spirit and scope of my invention as indicated by the appended claims.

What I claim is:

1. In a container of the character described for a well-shooting explosive charge adapted to be positioned longitudinally-vertically in a well hole and having walls defining a longitudinally-extending explosive-receiving chamber, a hollow positioning member secured to said walls and extending longitudinally-centrally along the explosive-receiving chamber, an enclosed annular directionating device secured on said member and extending transversely therefrom, said device having walls defining an enclosed chamber, reinforcing ribs extending between said last-mentioned walls and across the enclosed chamber defined thereby, and said device being positioned intermediate opposite longitudinal ends of the explosive-receiving chamber and being constructed and arranged to direct and concentrate explosive forces outwardly in a transverse path from the container.

2. In a container as defined in claim 1 wherein, said last-mentioned walls define a transversely-continuous chamber of a radially outwardly-expanding angle-shape.

3. In a container of the character described for a well-shooting explosive charge which container is to be positioned longitudinally-vertically in a well hole in substantial alignment within a productive stratum, said container having walls defining a vertically-extending explosive-receiving chamber, a primary directionating device having walls defining an enclosed air space area and positioned within the container intermediate vertical ends of its explosive-receiving chamber and projecting laterally along the chamber, said primary device having a vertical axial bore therethrough, a second directionating device having walls defining an enclosed air space area and being positioned concentrically within the axial bore of said primary device in substantial lateral alignment with said primary device, said directionating devices having outer face portions of major vertical extent to direct and concentrate exposive forces generated by explosive material positioned within the explosive-receiving chamber in a lateral path from the container into the productive stratum, and the outer face portion of said primary directionating device having a spaced-apart relationship with an outer wall of said container to bypass explosive material between upper and lower portions of the explosive-receiving chamber of said container.

4. A structure of the character described adapted to be longitudinally-vertically positioned within a well hole to support a well shooting explosive charge which comprises, a longitudinally-extending outer shell about a longitudinally-extending inner shell, said outer shell having walls defining an explosive charge-receiving outer chamber, a directionating device for explosive forces having a wall defining a laterally-extending closed annular space, said device being positioned within tthe outer chamber and between longitudinal ends of said outer shell and being secured on said inner shell, said inner shell extending through opposed longitudinal ends of said outer shell, a pair of spacer shells, and means connecting one of said spacer shells to one longitudinal end of said inner shell and connecting the other spacer shell to the opposite longitudinal end of said inner shell to position the structure within the well hole.

5. A structure as defined in claim 4, wherein a secondary directionating device having supporting walls defining an enclosed annular area of different density than the explosive material is positioned within the inner chamber, and passageways extend through said inner shell and connect the inside of said inner shell to the outer chamber defined by said outer shell for passing explosive charge into the inside of said inner shell.

6. A structure as defined in claim 4, wherein an electric squib is positioned on the structure to extend within the outer chamber, and electrical connections extend along the inside of said inner shell and are connected to said electrical squib for detonating the explosive charge.

7. A structure as defined in claim 4, wherein said directionating device has a lesser lateral extent than the inside diameter of the outer chamber defined by said outer shell to bypass explosive material therebetween.

8. A structure as defined in claim 4, wherein said directionating device is of annulus-like shape and has walls defining a sealed-off space, has outwardly diverging top and bottom walls to define an increased width of spacing towards the outer periphery of said device, and has reinforcing ribs positioned in a spaced relationship with each other within the sealed-off space and in contact with said walls to prevent a collapse of said walls under pressure applied externally thereof.

9. A unit of a shooting string of the character described for applying explosive forces to a productive stratum of a well hole and to be longitudinally-vertically positioned within the well hole in substantial alignment with the productive stratum which comprises, a container having walls defining a vertically-extending explosive-material receiving chamber, a hollow positioning member located substantially horizontally-centrally of and extending vertically through said chamber and being secured to said container, said positioning member defining an inner vertically-extending explosive-material receiving chamber, a hollow secondary member extending vertically along positioning member for bypassing electrical connections therethrough, cap members secured over opposite end portions of said positioning member and mounting said secondary member, longitudinal spacer members connected to opposite end portions of said positioning member for mounting the unit on the shooting string, an electric squib positioned to extend within one of the explosive-material receiving chambers, electrical connections extending along said spacer members and said hollow secondary member, branch connections from said electrical connections to said squib, an annular directionating means having walls defining an enclosed air space area of major vertical extent at a lateral outer face portion of said means to concentrate explosive forces laterally-outwardly from said container into the productive stratum, and said directionating means being positioned around said positioning member and within said container.

References Cited in the file of this patent
UNITED STATES PATENTS
2,699,721     Klotz _____ Jan. 18, 1955